United States Patent [19]

Klös-Hein et al.

[11] Patent Number: 4,924,336

[45] Date of Patent: May 8, 1990

[54] MAGNETIC-TAPE-CASSETTE APPARATUS COMPRISING A MOTOR-DRIVEN AXIALLY MOVABLE SERVO ROD

[75] Inventors: Karl Klös-Hein, Wettenberg; Horst H. Rumpf, Herborn-Schönbach, both of Fed. Rep. of Germany

[73] Assignee: U.S. Philips Corporation, New York, N.Y.

[21] Appl. No.: 189,274

[22] Filed: May 2, 1988

[30] Foreign Application Priority Data

Jun. 13, 1987 [DE] Fed. Rep. of Germany ....... 3719890

[51] Int. Cl.⁵ .............................................. G11B 21/02
[52] U.S. Cl. ..................................... 360/105; 360/137
[58] Field of Search ..................... 360/96.3, 96.5, 105, 360/137; 242/197–201

[56] References Cited

U.S. PATENT DOCUMENTS 4,748,523  5/1988  Aldenhoven ......................... 360/105

FOREIGN PATENT DOCUMENTS 2149189  6/1985  United Kingdom .

*Primary Examiner*—A. J. Heinz
*Attorney, Agent, or Firm*—Brian J. Wieghaus

[57] ABSTRACT

A magnetic-tape-cassette apparatus comprises a servo rod axially movable in opposite directions which is driven by a motor. The servo rod controls functional elements of the apparatus, such as a head-mounting plate and a loading mechanism. The motor is also used for driving the turntables. The apparatus further comprises a control member whose position is defined by the servo rod and the head-mounting plate. The position of the control member determines the position of a rotatable switching member, which actuates switching means for a logic circuit for the motor. The switching means provides the force-sustained coupling between the motor and the servo rod, and disengages the turntables from the motor during the change-over of apparatus functions.

20 Claims, 6 Drawing Sheets

MAGNETIC-TAPE-CASSETTE APPARATUS COMPRISING A MOTOR-DRIVEN AXIALLY MOVABLE SERVO ROD

BACKGROUND OF THE INVENTION

The invention relates to a magnetic-tape-cassette apparatus comprising a servo rod which is driven by a motor and which is axially movable in opposite directions to control functional elements of the apparatus, such as a head-mounting plate and a loading mechanism.

In magnetic-tape apparatuses intended for playing tape cassettes, in particular Compact Cassettes, it is known to move the magnetic head relative to the magnetic tape in the cassette. This is effected by moving a head-mounting plate carrying the magnetic head. Generally, such an apparatus also comprises a loading mechanism adapted to receive a Compact Cassette and bring it in a play position. For this purpose it is common practice to employ a lifting device. In apparatuses of the auto-reverse type the tape transport direction depends on the direction of rotation of the motor, pressure rollers being pressed against a first or a second capstan and the turntables being driven in one direction or the other.

Moreover, EP-A-95,815 corresponding to U.S. Pat. No. 4,573,088 describes a magnetic-tape apparatus in which a servo rod can be driven in each of its axial directions by means of a motor. To perform control functions the servo rod must always be set to a reference position to which the various functions are referred. This is both mechanically and electrically intricate and requires much time between the instant at which a play function is stopped and restarted.

It is the object of the invention to provide a magnetic tape cassette apparatus which employs the known servo rod and in which the time required for switching between the apparatus functions is reduced.

SUMMARY OF THE INVENTION

According to the invention this object is achieved in that the motor is additionally used for driving the turntables, in that a control member is provided whose position is dictated by the servo rod and the head-mounting plate, and from whose position the position of a rotatable switching member is derived which switching member is adapted to actuate switching means for a logic circuit for the motor, to provide the force-sustained coupling between the motor and the servo rod, and to disengage the turntables from the motor during the change-over of apparatus functions.

The control member is then influenced both by the servo rod and by the head-mounting plate. In this way the position of the control member is dictated both by the head-mounting plate and by the servo rod. This means that the head-mounting plate can control a switching process and that the servo rod can perform switching functions via the control member. The position of the control member dictates the rotation of the switching member in such a way that this member can control the motor with the aid of the switching means via the logic circuit and can thus influence the tape-deck functions. Moreover, by means of the rotatable switching member the control member provides the force-sustained coupling of the motor to the control rod, so that the control rod can also perform function control. Finally, the third function of the switching member is to disengage the turntables from the motor during the change-over of apparatus functions and thus, in fact, switches off the magnetic-tape drive during a change-over of apparatus functions. If the rotatable switching member enables the turntable to be driven, the same motor which drives the servo rod can also drive the relevant turntable. It is to be noted that the pressure rollers can also be changed over by means of the same motor.

In another embodiment of the invention the switching member carries a switching wheel which provides the force-sustained coupling between the motor and the servo rod during the change over of apparatus functions. The selective coupling between the servo rod and the motor via the switching wheel enables the switching functions to be performed rapidly and in the time intervals in which the switching wheel is not coupled to the servo rod the motor can drive one of the turntables or change over the pressure rollers.

In a further embodiment of the invention the coupling process of the switching wheel is always initiated by the cooperation between the control member and the switching member, the switching member being pivoted into a coupling position in which it is held by the cooperation with the control member or with the servo rod. This means that the switching wheel can be occupy in the coupling position depending on two criteria, namely via the position of the control member or depending on the direction of rotation of the switching wheel relative to the servo rod.

In a further embodiment of the invention, the switching member comprises an actuating limb, a release limb and a positioning limb, which are adapted to cooperate with the control member, with a pivotal arm of the turntable drive and with the servo rod respectively. The three different limbs of the switching member can each perform specific functions adapted to the movements of the control member, the pivotal arm and the servo rod.

In a further embodiment of the invention the switching member is constructed as a three-arm switching lever which is spring loaded in one pivotal direction and which comprises said limbs. Thus, the control member can pivot the switching member in one direction against spring force and, as it returns, the switching member can assume its other positions under spring load.

In a further embodiment of the invention the actuating limb carries the switching wheel and comprises an inclined surface via which the actuating limb can cooperate with an inclined surface of the control member. In this way the actuating limb can bring the switching wheel in mesh with a motor-driven central gear wheel, the inclined surfaces ensuring that meshing is effected reliably.

In a further embodiment of the invention the positioning limb carries a guide pin which is adapted to engage with the servo rod in two positions. This guide pin enables the switching member to occupy two specific positions relative to the servo rod independently of the position of the control member.

In a further embodiment of the invention the release limb carries a wide-jaw fork which is adapted to limit the movement of the pivotal arm during switching-over of the apparatus functions so as to render the turntable drive inoperative. This ensures that if the switching member is in a position in which the servo rod controls switching functions the motor cannot drive the turntables. This is important for a correct separation between the function change-over and the tape drive.

In a further embodiment of the invention the control member is constructed as a control lever having one end adapted to cooperate with the head-mounting plate and another end adapted to cooperate with the servo rod, the control lever being guided so as to be axially movable and pivotable, and spring means are provided to urge the control lever towards the head-mounting plate and in one pivotal direction. This the control member is supported in a sort of floating manner and can occupy different positions between the head-mounting plate and the servo rod. This is important in order to control the switching member for specific switching functions. Moreover, it is important to control the servo rod relative to the head-mounting plate.

In a further embodiment of the invention said other end carries a follower pin which is movable in a unidirectional guideway of the servo rod during the forward and backward movement of the servo rod. If the follower pin moves in one direction relative to the servo rod, the unidirectional guideway and the Shadow-type Catch arranged in said guideway ensure that in one direction said pin occupies another position relative to the servo rod than in the other direction.

In a further embodiment of the invention the head-mounting plate comprises a base carrying the magnetic head and pressure rollers, and a first limb and is pivotable about a pivot at a corner portion between the base and the first limb, the free end of the first limb being provided with a control projection and a transport projection which is spring-loaded relative to the first limb, which projections are adapted to cooperate with the control member and the servo rod respectively. The transport projection is actuated by the servo member and the control projection is actuated by the control member. The transport projection should enable a kind of overtravel to be attained in order to prevent the head-mounting plate and the servo rod from being deformed.

In a further embodiment of the invention the head-mounting plate is U-shaped and comprises a second limb which is extensible to increase its length relative to the base and which in the proximity of its free end can cooperate with an electromagnet to hold the head-mounting plate in two operating positions. Thus, the head-mounting plate can be set to two different operating positions and can be held in these different operating positions.

In a further embodiment of the invention the switching means comprise a control switch having a switch actuator which can be actuated either by the switching member or by the servo rod. If specific rotary positions of the switching member are requested via the control member and the switching member, the switch actuator is actuated in conformity with the rotation of the switching member to control the motor via the logic circuit of the apparatus. The servo rod can operate the logic circuit via the same switch actuator in order to control the motor via the logic circuit. It is important that electrical switching of the motor is not effected until the switching member has been actuated mechanically. The position of the switch actuator is then noncritical. This simplifies the contruction of the apparatus.

In a further embodiment of the invention the switch actuator can be actuated by the positioning limb or by a switching projection on the servo rod. Thus, the switch actuator is actuated either by the positioning limb or by the switching projection on the servo rod.

In a further embodiment of the invention the servo rod is adapted to cooperate with a lift slide of the loading mechanism via a coupling member, the lift slide controlling the height position of a lift compartment of the loading mechanism. Thus the lift slide can influence the servo rod and vice versa, so that in one case the lift slide can actuate the servo rod during insertion of the cassette and in the other case the servo rod can actuate the lift slide.

In a further embodiment of the invention the lift slide is movable relative to the apparatus chassis and parallel to the servo rod and is supported on the apparatus chassis via an over-centre spring, which over-centre spring, when a cassette is inserted into the lift compartment, moves the servo rod over a specific distance towards the transport projection via the lift slide and the coupling member. Thus, the overcentre spring ensures that after insertion of the cassette the lift slide is automatically moved further and drives the servo rod until driving is taken over by the motor.

In a further embodiment of the invention, during said movement of the servo rod, the follower pin of the control member traverses a part of the unidirectional guideway and thereby actuates the control member in such a way that its inclined surface, by means of the inclined surface of the actuating limb, couples the motor to the servo rod via the switching wheel and actuates the switching means. After the servo rod has thus been moved further by means of the over-centre spring the motor drive can be switched on reliably and the control switch ensures that the movement of the servo rod is continued via the motor drive. This enables further switching functions to be performed by the servo rod under motor control.

BRIEF DESCRIPTION OF THE DRAWINGS

The invention will now be described in more detail, by way of example, with reference to the accompanying drawings. In the drawings.

DESCRIPTION OF THE PREFERRED EMBODIMENTS

Figure 1:
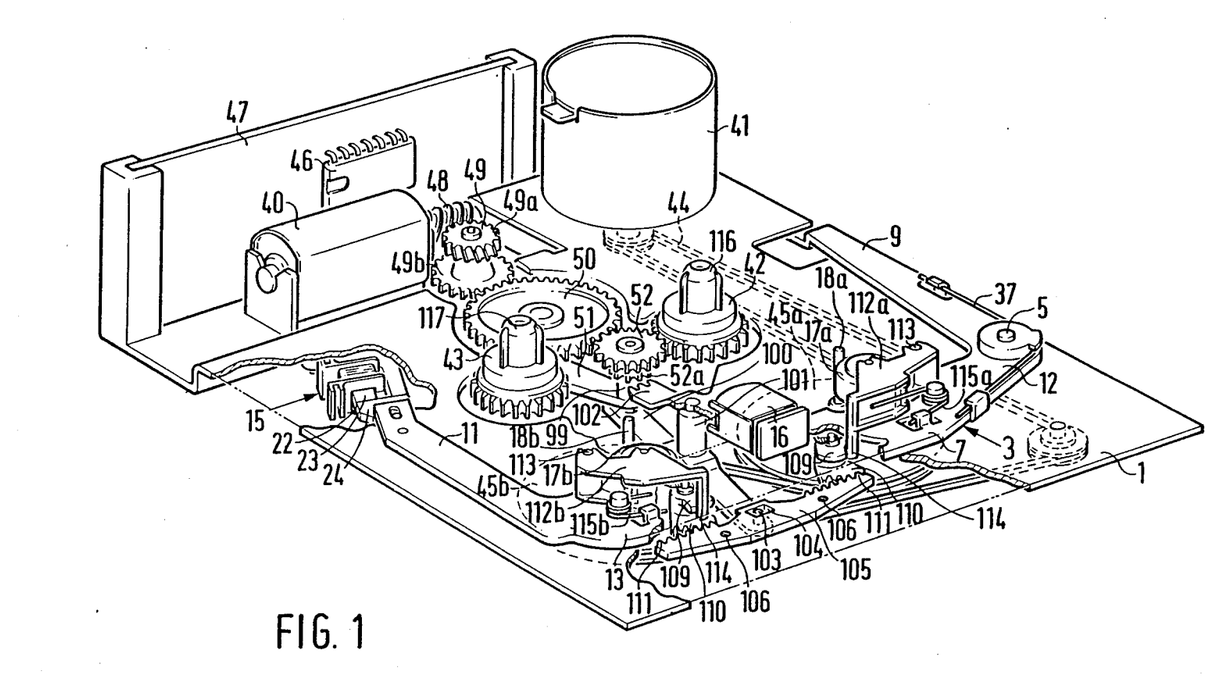
FIG. 1 is a perspective view the tape-deck of a magnetic tape apparatus.
Figure 2:
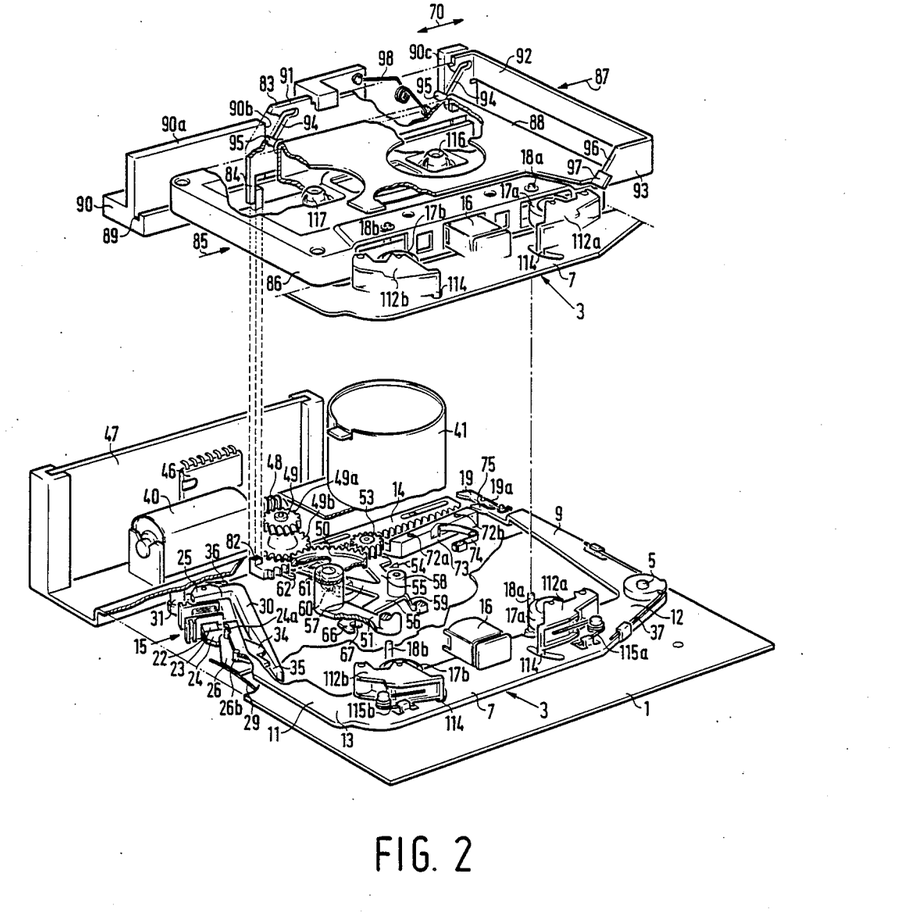
FIG. 2 is an exploded diagrammatical view of the lift mechanism and the control mechanism for a head-mounting plate and for the lift mechanism.

FIGS. 1 and 2 show a deck plate 1 which serves as the chassis of a magnetic tape cassette apparatus comprising a head-mounting plate 3 which is pivotable about an eccentric pivot 5. The head-mounting plate 3 is U-shaped and comprises a first limb 9 and a second limb 11 which project from the ends of its base 7 in the same direction. At the location where the limbs 9 and 11 are connected to the base corner portions 12 and 13 are formed. The first limb 9 is adapted to cooperate with a servo rod 14 (not shown in FIG. 1) and the second limb 11 consitutes a functional element which is adapted to cooperate with an electromagnetic holding device 15.

The base 7 of the head-mounting plate 3 carries a magnetic head 16 and pressure rollers 17a, 17b which are pivotable relative to the base 7. The pressure rollers 17a and 17b can be applied to the capstans 18a and 18b to move the magnetic tape past the magnetic head 16 in one direction or in other.

The head-mounting plate 3 is pivoted via the servo rod 14. This servo rod 14 acts on a spring-loaded transport projection 19 which is pivotally arranged on the limb 9. By means of the servo rod 14 the head-mounting plate 3 can be pivoted clockwise about the eccentric pivot 5 each time that it is actuated by means of the servo rod 14.

The electromagnetic holding device 15 comprises a magnet coil 20 whose innerspace 21 (FIG. 3) is traversed by limbs of U-shaped magnetically isolated armatures 22, 23. The two armatures 22, 23 are superimposed, the relevant armature limbs 22a, 23a overlapping one another pairwise. The yokes 22b, 23b are situated at opposite coil ends 20a, 20b. The electromagnetic holding device 15 is fixed to the deck plate 1.

The free ends of the limbs are formed with polepieces 23c and 22c which are adapted to cooperate with a first armature plate 24 and a second armature plate 25. By means of a pin 24a the first armature plate 24 is pivotably mounted on a slide 26. The pin 24a on this slide 26 engages a guide slot 27 in the limb 11. A guide pin 26b of the slide 26 is guided in an arcuate slot 28 in the limb 11. The slot 28 extends obliquely towards the electromagnetic holding device 15 along an arcuate path. A spring 29 ensures that the guide pin 26b normally engages the end portion 28a of the arcuate slot 28. In this position the slide 26 extends above and parallel to the limb 11.

The second armature plate 25 is arranged on an arm 30 so as to be pivotable by means of a pin 25a. The L-shaped arm 30 has a shorter arm portion 30a carrying the second armature plate 25 and at its end 30b it is pivotable in the directions indicated by double arrow 32 about a pivot 31. A longer arm portion 30c extends parallel to the magnet coil 20 up to a lateral surface 33 of the slide 26 where it terminates in the proximity of a nose 34 of the slide, which nose has an inclined surface 35.

When applied to the polepieces 23c and 22c respectively, the armature plates 24 and 25 can stick to the polepieces if the magnet coil 20 is energised. In this way they define two operating positions of the head-mounting plate 3 as long as the magnet coil 20 is energised. Depending on whether one or both plates has-have been applied one or both armature plates is/are released when the magnet coil 20 is de-energised and a spring 37, which acts on the base 7 of the head-mounting plate 3, can pivot the head-mounting plate 3 clockwise into a rest position. The holding electromagnet device is described comprehensively in U.S. patent application No. 4,573,088.

Figure 4:
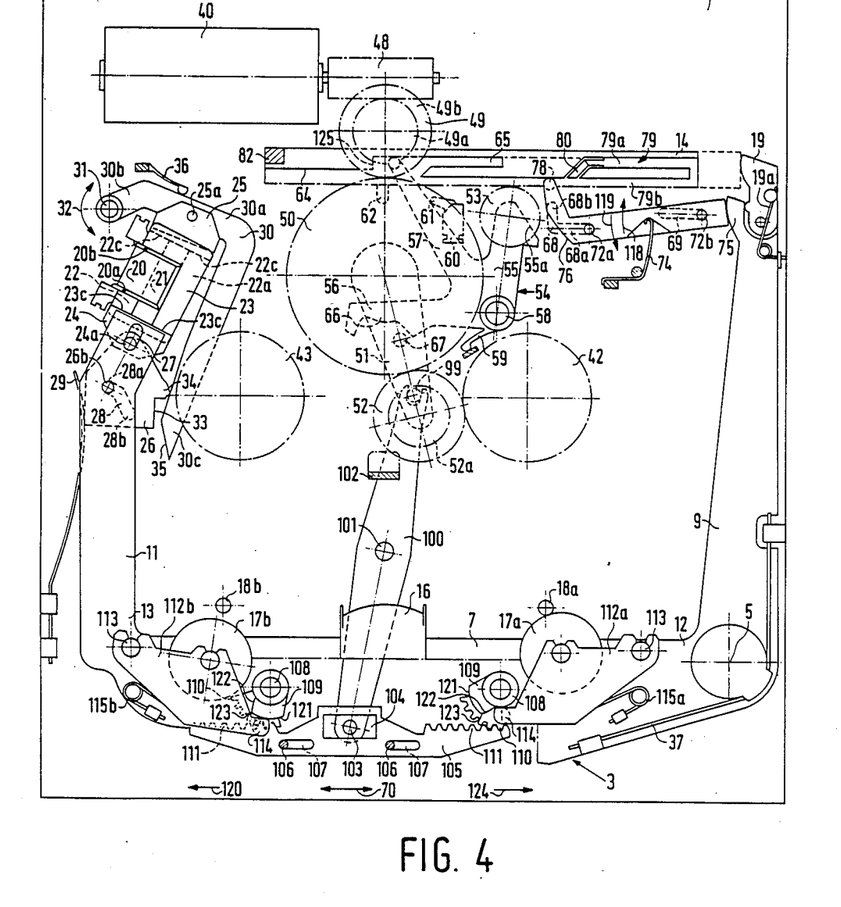
FIG. 4 shows the mechanism of FIG. 3 in its play position.
Figure 5:
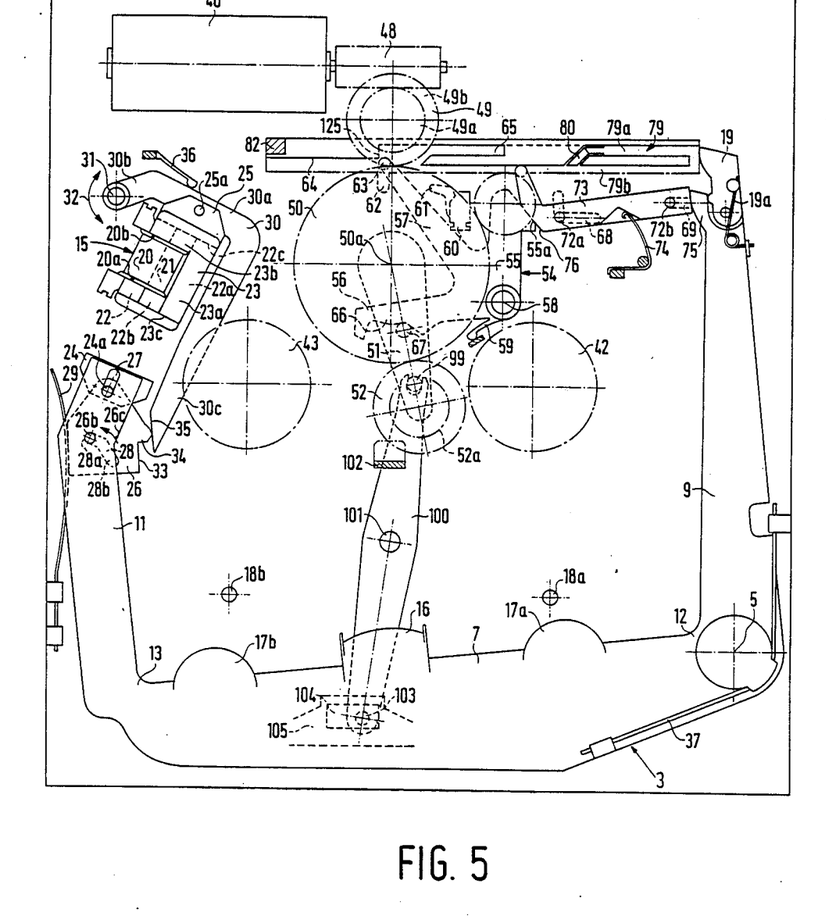
FIG. 5 shows the mechanism of FIG. 3 in the standby position.

How the head-mounting plate cooperates with the holding electromagnets will now be explained by describing the operation of these magnets. FIG. 5 shows the stand-by or rest position. The magnet coil 20 is not energised and the armature plate 24 is clear of the polepieces 23c of the armature iron 23. The armature plate 25 is constantly urged against the polepieces 22c by a spring 36. The spring 37 ensures that the head-mounting plate 3 is pivoted anti-clockwise into the rest or stand-by position. Both the mangetic head 16 and the pressure rollers 17a and 17b are fully clear of a magnetic tape, not shown, which moves between the pressure-roller/capstan pairs 17a, 18a/17b, 18b past the magnetic head 16. If the head-mounting plate is to be pivoted into and held in the play position, i.e. a first operating position (FIG. 4), the servo rod 14, in the position indicated in broken lines, abuts against the transport projection 19, causing the head-mounting plate 3 to be pivoted clockwise. The magnet coil 20 remains de-energised for the time being. As the head-mounting plate 3 is pivoted clockwise, the limb 11 is moved towards the holding electromagnet device 15. The nose 34 of the slide 26 abuts against the inclined surface 35 of the longer arm portion 30c. The spring 36 is so weak that the nose 34 presses the surface 35 and hence the longer arm portion 30c outwards in the anti-clockwise direction. The guide pin 26b remains in the end portion 28a. The functional element 11 positions the first armature plate 24 against the polepieces 23c. Now the magnet coil 20 is energised and the armature plate 24 is held against the polepieces 23c (FIG. 4). Thus the head-mounting plate 3 is also held in the play position, i.e. the first operating position. If the play mode has ended or if it is required to changeover to fast forward or reverse operation, the magnet coil 20 is de-energised and the spring 37 causes the head-mounting plate to be returned into the rest or stand-by position in the anti-clockwise direction. From this rest or stand-by position it is possible to proceed to the fast-wind or the play position. How the play position is reached has already been described in the foregoing. How the fast-wind position (FIG. 6), i.e. the second operating position, is reached and held will be described hereinafter.

To reach the fast-wind position (FIG. 6) the magnet coil 20 is energised. The second armature plate 25 is already positioned against the polepieces 22c and now the magnetic holding force assists the force exerted by the spring 36. Thus, it has become more difficult to pivot the longer arm portion 30c away in the anti-clockwise direction. The servo rod 14 perform one forward movement to pivot the head-mounting plate 3 in the clockwise direction. Now the nose 34 of the slide 26 cannot pivot away the longer arm portion 30c. This means that the nose 34 must give way to the surface 35 of the longer arm portion 30c. As a result of this, the guide pin 26b is moved towards the other end 28b of the arcuate slot 28. This movement causes the guide pin 24a of the slide 26, which slide is pivoted in the direction indicated by an arrow 26c, to be moved in the slot 27 towards the holding electromagnet device 15. The effect of this is that the limb 11 is, in fact, extended towards the electromagnetic holding device 15. As a result of this extension the limb 11 cannot move so far towards the holding electromagnet device 15 as described in the foregoing for the play position. The servo rod 14 performs the same travel and pivots the transport projection 19 with overtravel into its dash-dot position (FIG. 6), opposed by its spring 19a. Consequently, the head-mounting plate 3 is slightly out of the play position shown in FIG. 4 and the magnetic tape is not in intimate contact with the magnetic head 16. Thus the position for fast forward and reverse winding is reached. Moreover, the pressure rollers 17a and 17b are not applied to the associated capstans 18a, 18b.

If fast forward or reverse winding is to be terminated, the magnet coil 20 is de-energised. As a result of this the armature plate 24 is released from the polepieces 23c and the spring 37 can pivot the head-mounting plate 3 back into the rest or stand-by position (FIG. 5) in the anti-clockwise direction. When the construction just described is used this means that it is always necessary to return to the stand-by position before it is possible to switch to the play or fast-wind position.

The deck plate 1 carries two motors 40 and 41. The motor 40 serves for controlling the movements of the head-mounting plate and for driving the turntables 42, 43. The motor 41 serves for driving the capstans 18a, 18b via a belt 44. This is effected via flywheels 45a, 45b. The belt 44 is passed around the flywheels 45a, 45b in an S-shape to obtain opposite directions of rotation of the capstans 18a, 18b. The motors are controlled via a logic circuit 46 arranged on a circuit board 47. The circuit board 47 is mounted on the deck plate 1.

Figure 3:
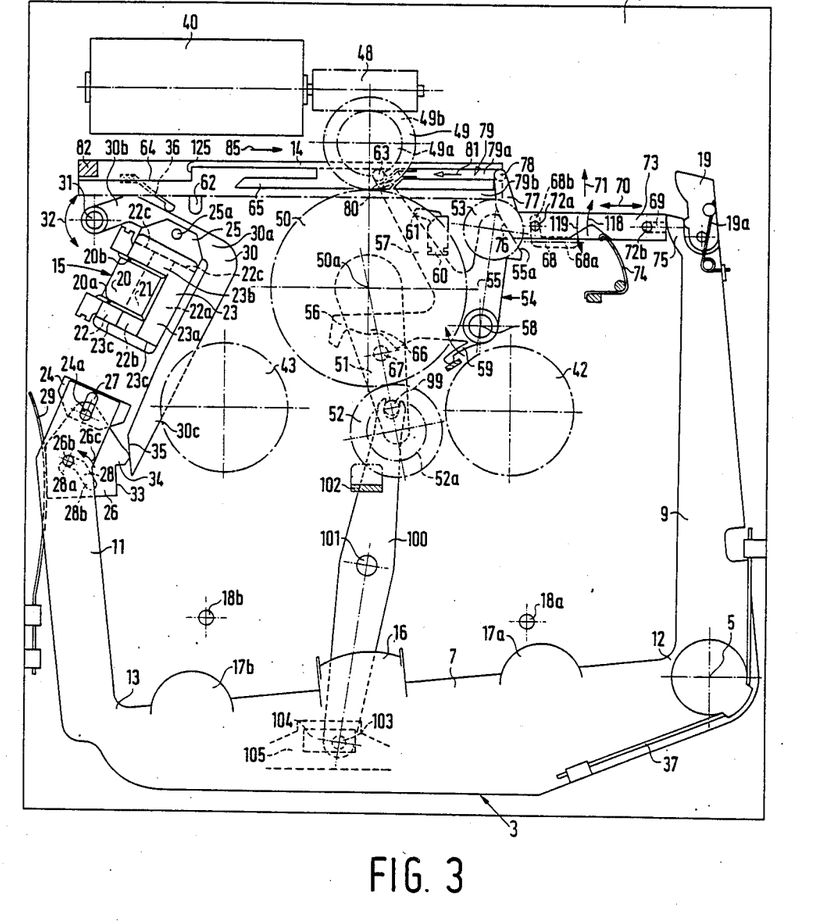
FIG. 3 is a diagrammatic plan view of the mechanism of the apparatus in the eject position.
Figure 6:
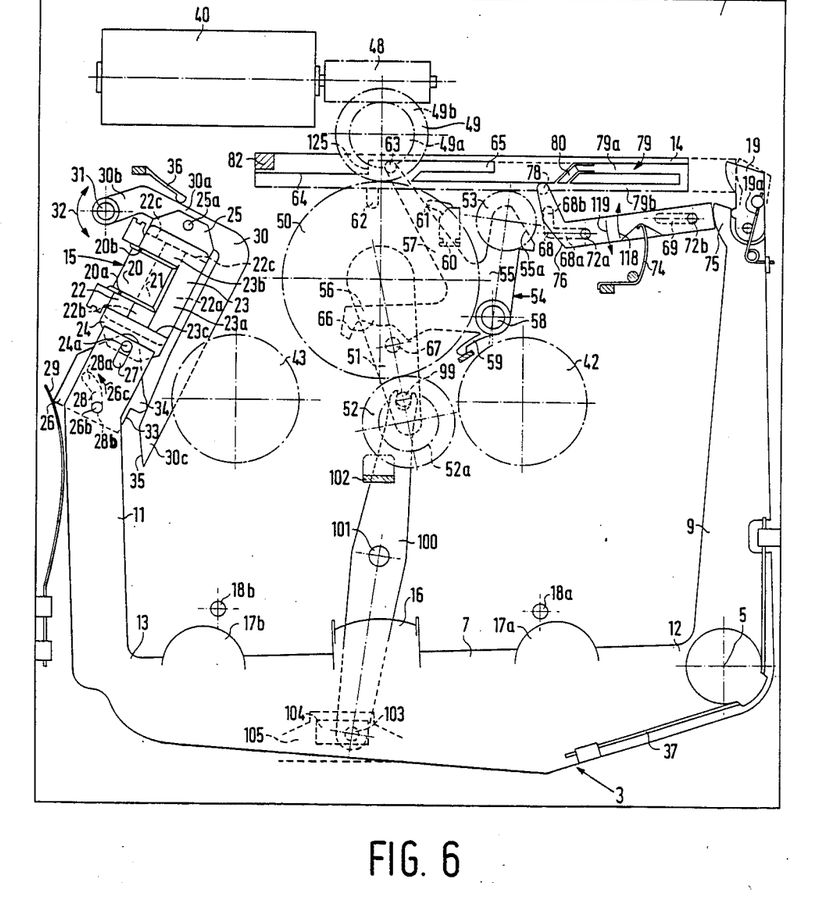
FIG. 6 shows the mechanism of FIG. 3 in a fast-wind position.

The motor 40 drives a central gear wheel 50 via worm shaft 48 and a reduction gear wheel 49 comprising two wheel sections 49a and 49b. A pivotal arm 51 is pivotable about the spindle 50a of the central gear wheel 50 and pivotally supports a transmission gear wheel 52. The transmission gear wheel 52 is pivotable via a friction clutch, not shown, between the pivotal arm 51 and the central gear wheel 50, to drive either the turntable 42 or the turntable 43. The servo rod 40 is movable in its axial direction by means of a switching wheel 53. The switching wheel 53 belongs to a switching member 54 and is rotatably supported on an actuating limb 55 of the switching member 54. The switching member 54 further comprises a release limb 56 and a positioning limb 57. The switching member 54 is pivotable about a spindle 58 and is urged clockwise by means of a resilient arm 59. The deck plate 1 further carries a control switch 60 whose switch actuator 61 is adapted to cooperate with the positioning limb 57 and a switching projection 62 of the servo rod 14. The positioning limb 57 carries a guide pin 63 which engages with the servo rod 14 in two positions. One of said positions is shown in FIGS. 3, 4 and 6 and the other position is shown in FIG. 5. In order to be set to the position shown in FIG. 5 the servo rod comprises an edge 64 which controls the second position. The first position is defined by a slot 65 in the servo rod 14. The released limb 56 of the three-arm switching member 54 comprises a wide-jaw fork 66 which is adapted to cooperate with a limiting pin 67 on the pivotal arm 51.

In the deck plate 1 two slots 68 and 69 are formed. The slot 68 is L-shaped and the slot 69 is a straight slot which extends in the direction of movement of the servo rod 14. The direction of movement of the servo rod is indicated by a double arrow 70. The slot 68 has a slot portion 68a which extends in the direction indicated by the double arrow 70 and a portion 68b which extends perpendicularly thereto, in a direction perpendicular to the double arrow 70. This perpendicular direction is indicated by an arrow 71. The slots 68 and 69 are engaged by guide pins 72a, 72b of a control member 73. A spring 74 urges this control member 73 in two directions, inter alia towards a control projection 75 which is rigidly connected to the free end of the first limb 9. The control projection 75 is situated in the proximity of the transport projection 9. The second direction in which the control member 73 is urged by the spring 74 is indicated by the arrow 71. The control member 73 has an inclined surface 76 adapted to cooperate with an inclined surface 55a on the actuating limb 55. The control member 73 is L-shaped and comprises a short arm portion 77 carrying a follower pin 78. This follower pin is adapted to cooperate with a unidirectional guide way 79 in the servo rod 14. This unidirectional guide way comprises two paths 79a, 79b interconnected by a schadow-type Catch 80. This schadow-type Catch 80 is resilient in such a way that the follower pin can move past this Catch in the direction indicated by an arrow 81 but not in the opposite direction. After the follower pin 78 has passed the schadow-type Catch 80 enter the path 79b, it cannot return but has to follow the path 79b which extends in the direction indicated by the double arrow 70.

The servo rod 14 is provided with a coupling member 82 to establish the connection with a lift slide 83. This lift slide 83 comprises a projection 84 which can exert pressure on the coupling member 82 in the direction indicated by an arrow 85. The direction of the arrow 85 corresponds to the direction of insertion of a cassette 86 into a loading mechanism 87 to which the lift slide 83 belongs. The loading mechanism 87 comprises a lift compartment 88 adapted to receive the cassette 86.

The lift slide 83 is guided by a guide 89 so as to be axially movable in the direction indicated by the double arrow 70. The guide 89 forms part of a plastics element connected to the deck plate 1 in a manner not shown. The lift slide 83 as shown in FIG. 2 is substantially U-shaped, comprising a long limb 91, a base 92 and a short limb 93. The long limb 91 is formed with two inclined slots 94 in which pins 95 of the lift compartment 88 are guided. The short limb 93 is formed with an inclined surface 96 which is adapted to cooperate with a tab 97 of the lift compartment. In this way the lift compartment 88 is in principle guided at three points relative to the lift slide 83. Moreover, an over-centre spring 98 acts on the plastics element 90 and on the long limb 91 of the lift slide 83.

The plastics element 90 has a horizontal edge surface 90a bounded by a vertical edge surface 90b. A further vertical edge surface 90c extends parallel to the vertical edge surface 90b. The distance between the two vertical edge surfaces 90b and 90c corresponds to the distance between the pins 95, the pins 95 being movable between and along the vertical edges surfaces 90b and 90c.

FIG. 1 further shows that a pivotal arm 51 supporting the transmission gear wheel 52 is arranged between the turntables. The pivotal arm 51 has a pivot 99, which is engaged by an actuating lever 100 which is pivotable about a pivot 101. Within a range of the pivotal movement of the transmission gear wheel 52 a stationary gear segment 102 is arranged, with which segment the transmission gear wheel 52 can mesh. For this purpose the transmission gear wheel carries a gear wheel section 52a on its underside. At the end of the actuating lever 100 which is remote from the pivot 99 said lever 100 carries a pin 103 which is movable to a limited extent in a slot 104. The slot 104 is formed in a slide 105 comprising the pins 106 which are movable in slots 107 in the deck plate in a direction parallel to that indicated by the double arrow 70.

Eccentric discs 109 connected to gear segments 110 are mounted on the deck plate 1 so as to be pivotable about spindles 108 (FIG. 4). These gear segments 110 cooperate with toothed racks 111 of the slide 105. Thus, by a pivotal movement of the actuating lever 100 about the pivot 101 the pin 103, after it has reached one of the ends of the slot 104, can move the slide 105 in one of the directions indicated by the double arrow 70. During this movement the eccentric discs 109 are rotated. The pressure rollers 17a, 17b are supported in members 112a, 112b, which in their turn are pivotable about spindles 113. The spindles 113 are mounted on the head-mounting plate 3. The members 112a and 112b comprise pins 114 which are adapted to follow the cam surface of the eccentric discs 109. The members 112a and 112b are spring loaded towards the capstans 18a, 18b by means of springs 115a, 115b. The springs 115a and 115b urge the pins 115 against the eccentric discs 109.

If there is no cassette in the tape deck the parts of the deck are in a position relative to one another as shown in FIG. 3. If the apparatus is to be put into operation a cassette 86 is inserted into the lift compartment 88. When the cassette is inserted by hand the projection 84 of the lift slide sets the coupling member 82 in motion. When the lift slide 83 is moved inwards the servo rod 14 is also moved. The over-centre spring 98 is now tensioned and when its over-centre point is passed it pulls the lift slide further inwards without the cassette 86 being moved by hand. When the lift slide is moved further inwards the servo rod is also moved further in the direction of insertion 85. During this movement of the servo rod 14, the inclined surfaces 55a and 76 abut against one another and the switching member 54 is pivoted anti-clockwise. As a result of this the switching wheel 53 couples the central gear wheel 50 to the servo rod. The pivotal movement of the switching member 54 also results in the switching projection 61 being released by the positioning limb 57. This release forms a command for the logic circuit 46 to start the motor 40. As a result of this the servo rod is further moved in the direction of insertion 85 by means of the motor 40. Now the projection 84 need no longer drive the coupling member 82 and the lift slide is moved further in the direction of insertion 45 only by the force of the over-centre spring, which movement continues until the pins 95 can slide down the vertical edge surfaces 90b and 90c, the pins 95 also sliding downwards in the inclined slots 94. At the same time the tab 97 slides down the inclined surface 96. This downward movement ceases when the lift slide 93 has reached its rearmost end position shown in FIG. 2. In this position the lift compartment 88 has reached its rearmost and lowermost position and the cassette 86 is engaged by the winding spindles 116, 117.

During the movement of the servo rod 14 in the direction indicated by the arrow 85 the follower pin 78 of the control member 73 has entered the path 79a in the direction indicated by the arrow 81. The follower pin 78 assumes the entry position under the influence of the spring 74. The control member 73 has then pivoted about the guide pin 72b. This pivotal movement is indicated by the arrow 118. The follower pin 78 enters the path 79b via the schadow-type Catch 80. The control member 73 is then pivoted in the direction indicated by an arrow 119. As a result of this pivotal movement the switching member 54 has been pivoted so far anti-clockwise via the inclined surfaces 55a and 76 that the limiting pin 67 engages between the arms of the wide-jaw fork 66. This fork ensures that the transmission gear wheel 52 cannot mask with the turntables 42 and 43.

The drive of the servo rod 14 via the switching wheel 53 is self-locking in the outward direction, i.e. the direction opposite to that indicated by the arrow 85. This means that in the stand-by position shown in FIG. 5 the guide pin 63 is retained in a corner portion 125 between the edge 64 and the slot 65. This is the position in which the wide-jaw fork 66 acts against the limiting pin 67 and urges the transmission gear wheel 52 away from the turntable 42 or 43. In the inward direction indicated by the arrow 85, however, the drive by means of the switching wheel 53 is self-releasing. This means that the switching wheel can automatically become disengaged from the central gear wheel when the servo rod performs a pulling movement, if the control member 73 does not limit the path of movement. In the opposite outward direction the self-locking feature of the switching wheel 53 ensures that the guide pin 63 remains in the corner portion 125 without any special guiding measures.

In order to reach the play position shown in FIG. 4 the servo rod 14 moves so far to the right as indicated by the broken lines in FIG. 4. In this position the servo rod 14 has already pivoted the head-mounting plate 3 into its play position as can be seen in FIGS. 1 and 4, in a manner as described above. In the extreme right-hand position of the servo rod 14 the switching projection 62 of the servo rod has contacted the switch actuator 61. As a result of this the logic circuit 46 gives a reversal command to the motor 40. If the motor 40 has received the reversal command via the projection 62 its voltage remains high. The servo rod 14 now returns to the left in a direction opposite to that indicated by the arrow 85. The control member 73 and the switching member 54 have then become disengaged from one another. The force of the spring 59 causes the switching member 54 to be pivoted clockwise, so that the limiting pin 67 is released by the fork 66. During this clockwise pivotal movement the positioning limb 57 has again actuated the switch actuator 61. As a result of this re-actuation the logic circuit 46 applies a lower voltage to the motor 40. Consequently, the motor now operates with a smaller torque. The large motor torque is required only for the switching functions and not for normal playing operation. During the clockwise rotation the switching wheel 53 has become disengaged from the central gear wheel 50, so that the servo rod 40 is no longer driven. At the same time as the movement of the servo rod 14 to its extreme right hand position and the pivotal movement of the head-mounting plate 3, the control member 73 has moved away from the inclined surface 55a of the switching member 54, because this control member has also moved in the same direction as a result of the force of the spring 74. The spring 79 moves the switching member 54 in a clockwise direction and the guide pin 73 assumes its other position relative to the servo rod. The release limb 56 has also moved clockwise away from the limiting pin 67 clockwise, so far that the transmission gear wheel 52 can now mesh with and drive the turntable 42, as is shown in FIG. 4.

At the same time a pressure-roller actuation has taken place. The actuating lever 100 has moved the slide 105 to the left in the direction indicated by an arrow 120. The toothed racks 111 have rotated the eccentric discs 109 clockwise via the gear segments 110. The pin 114 of the right hand member 112a has then left the surface 121 of the eccentric disc 109 and has abutted against an edge 122, against which it is constantly urged by the spring 115a. Simultaneously the pressure roller 17a is applied to the capstan 18a. A the sometime time the movement of the pin 114 from the surface 121 to the edge 122 via a corner portion 123 has resulted in the movement of the slide 105 in the direction indicated by the arrow 120, which movement has been initiated by the actuating lever 100, being taken over by the pin 114. Since the pin 114 of the right-hand eccentric disc 109 has now run onto the low edge 122, the pin 114 of the left-hand eccentric disc 109 has moved from the edge 122 onto the surface 121 via the corner portion 123. As a result of this the member 112b has been pivoted clockwise against the force exerted by teh spring 115b and the pressure roller 17b is lifted off the capstan 18b.

The apparatus is always controlled via the logic circuit 46. This means that external control commands are always applied to the logic circuit via keys or the like. It is obvious that a similar process is possible at the end of tape. If the transport direction of the apparatus is to be reversed the motor 40 is given a reversal command via the logic circuit when the end of tape is reached or by means of a push-button. This revresal of the direction of rotation causes the actuating lever 100 to move the slide 105 initially in the direction indicated by an arrow 124 until the pin 114 on the left-hand eccentric disc 109 has moved past the corner portion 123 and the pin 114 has taken over the movement of the slide 105 in the direction indicated by the arrow 124 via the edge 122. The pressure roller 17a has then become disengaged from the capstan 18a and the pressure roller 17b is applied to the capstan 18b. At the same time the transmission gear wheel 52 is pivoted from the turntable 42 to the turntable 43.

If the play mode is to be terminated, which can be effected for example by actuation of a key or in the absence of the operating voltage, the holding magnet device 15 is de-energised and the head-mounting plate 3 is pivoted anti-clockwise under the influence of the spring 37. This pivotal end position is illustrated in FIG. 5. The transport projection 19 has then abutted against the right-hand end of the servo rod 14. At the same time the control projection 75 has moved the control member 73 to the left to engage with the inclined surface 55a of the switching member 54. Now the switching wheel 63 again couples the central gear wheel 50 to the servo rod 14. At the same time the wide-jaw fork 66 has pivoted the limiting pin 67 so far to the centre that the transmission gear wheel 52 is no longer in mesh with the turntable 42. As a result of the anti-clockwise movement of the switching member 54 the positioning limb 57 has released the switch actuator 61. For the logic circuit 46 this release means that a new command will be applied. This command is obtained by depression of an actuating key. From this key the logic circuit 46 receives information on how to proceed. The following situations are possible:

1. If stand-by is desired, the logic circuit 46 turns off the motor 40.

2. If eject is desired, as illustrated in FIG. 3, the servo rod 14 is moved to the left, which results in the cassette 86 being ejected via the coupling member 82. The cassette is ejected by the over-centre spring 98.

3. If fast forward or reverse operation is desired, the holding magnet device 15 is energised as described in the foregoing and the servo rod is moved to the right as is shown in FIG. 6. As a result of the extension of the arm 11 the head-mounting plate cannot reach the play position. In this position the logic circuit ensures that motor has a large driving torque in order to obtain a fast tape transport.

4. If again the play mode is desired, the logic circuit 46 ensures that the servo rod is moved to the right (FIG. 4), causing the head-mounting plate to be pivoted into its play position.

What is claimed is:

1. A magnetic-tape-cassette apparatus, comprising:
   a motor;
   control means comprising a logic circuit for controlling said motor;
   a loading mechanism for carrying a tape cassette between an unload and a load position in said apparatus;
   a pair of rotatable turntables for winding the reels of a tape cassette loaded in said loading mechanism;
   a head mounting plate and a magnetic head carried on said plate;
      means for mounting said head mounting plate for movement between a rest and a play position;
   a servo rod translatable for controlling functional elements of the apparatus;
   coupling means for coupling said servo rod to said motor;
   turntable drive means for alternately coupling said winding turntables to said motor, said turntable drive means comprising a pivotable arm;
   a rotatable switching member for limiting movement of said pivotable arm during change over in apparatus functions such that said winding turntables are not connected to said motor and for coupling and uncoupling said servo rod to said motor for translating said servo rod in predetermined positions of said switching member;
   a control member for coupling said rotatable switching member and said head mounting plate, the position of said control member being determined by said servo rod and said head mounting plate such that in a first position of said control member said servo rod controls movement of said head mounting plate and in a second position of said control member said head mounting plate controls said rotary switching member; and
   switching means activatable by said switching member for activating said logic circuit for controlling said motor.

2. A magnetic tape cassette apparatus as claimed in claim 1, wherein said coupling means comprises a switching wheel carried on said switching member for driving said servo rod during change over of apparatus functions.

3. A magnetic tape cassette apparatus as claimed in claim 2, wherein said control member is arranged for pivoting said switching member to a coupling position in which said switching wheel is coupled to said servo rod and for holding said switching member in said coupling position.

4. A magnetic tape cassette apparatus as claimed in claim 2, wherein said switching member comprises: an actuating limb arranged to cooperate with said control member; a release limb for cooperating with said pivotable arm of said turntable drive means; and a positioning limb coupled to said servo rod for limiting the pivoting of said pivotable arm for a limited range of positions for said switching arm.

5. A magnetic tape cassette apparatus as claimed in claim 3, wherein said switching member comprises: an actuating limb arranged to cooperate with said control member; a release limb for cooperating with said pivotable arm of said turntable drive means; and a positioning limb coupled to said servo rod for limiting the pivoting of said pivotable arm for a limited range of positions for said switching arm.

6. A magnetic-tape-cassette apparatus as claimed in claim 5, wherein said actuating limb carries said switching wheel and comprises an inclined surface, and said control member further comprises an inclined surface for engaging said inclined surface of said actuating limb.

7. A magnetic-tape-cassette apparatus as claimed in claim 5, wherein the positioning limb (57) carries a guide pin which is adapted to engage with the servo rod in two positions.

8. A magnetic-tape-cassette apparatus as claimed in claim 5, wherein said release limb comprises a wide-jaw fork for limiting the movement of the pivotal arm during switching-over of the apparatus functions such that the turntable drive means does not drive said turntables.

9. A magnetic tape cassette apparatus as claimed in claim 5, wherein said switching member is spring-loaded in one pivotal direction.

10. A magnetic tape cassette apparatus as claimed in claim 1, wherein said switching member comprises: an actuating limb arranged to cooperate with said control member; a release limb for cooperating with said pivotable arm of said turntable drive means; and a positioning limb coupled to said servo rod for limiting the pivoting of said pivotable arm for a limited range of positions for said switching arm.

11. A magnetic tape cassette apparatus as claimed in claim 1, wherein said head-mounting plate comprises a base on which said magnetic head is mounted, a pair of pressure rollers mounted on said base on opposite sides of said head mounting plate, and a first limb joined to said base at a corner portion of said head mounting plate, extending from said corner portion, and terminating at a free end, said head-mounting plate being pivotable about a pivot at said corner portion, said first limb further comprising a control projection for coacting with said control member and a pivotable transport projection for coacting with said servo rod, and biasing means for biasing said transport projection towards said servo rod.

12. A magnetic-tape-cassette apparatus as claimed in claim 11, wherein said head-mounting plate is U-shaped and comprises a second limb having a free end which is extensible to increase its length relative to said base, and which apparatus further comprises an electromagnet arranged in the proximity of said extensible free end to hold the head-mounting plate in two operating positions.

13. A magnetic-tape-cassette apparatus as claimed in claim 1, wherein said switching means comprises a control switch having a switch actuator arranged to be actuated either by the switching member or by the servo rod.

14. A magnetic-tape-cassette apparatus as claimed in claim 13, wherein said servo rod further comprises a switching projection, and said switch actuator is arranged to be actuated by said positioning limb or by said switching projection on the servo rod.

15. A magnetic tape cassette apparatus as claimed in claim 14, wherein said loading mechanism comprises a lift compartment for carrying a cassette and a lift slide controlling the position of said lift compartment, and means for coupling said servo rod to said lift slide such that said servo rod controls the height of said lift compartment.

16. A magnetic-tape-cassette apparatus as claimed in claim 15, further comprising means for mounting said lift slide movable relative to the apparatus chassis and parallel to the servo rod and an over center spring for supporting said lift slide on the apparatus chassis.

17. A magnetic-tape-cassette apparatus as claimed in claim 16, wherein said over-centre spring is arranged to move said servo rod over a specific distance towards said transport projection via the lift slide and the coupling member when a cassette is inserted into the lift compartment.

18. A magnetic-tape-cassette apparatus as claimed in claim 17, wherein during said movement of the servo rod, said follower pin of the control member traverses a part of said one-way guide path and thereby actuates the control member in such a way that its inclined surface, by means of the inclined surface of the actuating limb, couples the motor to the servo rod via the switching wheel and actuates the switching means.

19. A magnetic-tape-cassette apparatus as claimed in claim 1, wherein said control member is a control lever having one end for cooperating with said servo rod and another end, and said apparatus further comprises guide means for guiding the control lever so as to be axially movable and pivotable, and spring means for urging said control lever towards the first limb and in one pivotal direction.

20. A magnetic tape apparatus as claimed in claim 19, wherein said servo rod comprises a unidirectional guideway, and said other end of said control member carries a follower pin received in a said guideway for axial translation of said servo rod.

* * * * *